United States Patent
Fowler

(10) Patent No.: US 7,417,843 B1
(45) Date of Patent: Aug. 26, 2008

(54) SYSTEM AND METHOD OF PROTECTING METALLIC STRUCTURES FROM LIGHTNING STRIKES

(75) Inventor: Benjamin P. Fowler, 2162 Gulf Terminal Dr., Houston, TX (US) 77023

(73) Assignees: Benjamin P. Fowler, Houston, TX (US); Fletcher Thorn-Thomson, Jr., Houston, TX (US)

(*) Notice: Subject to any disclaimer, the term of this patent is extended or adjusted under 35 U.S.C. 154(b) by 0 days.

(21) Appl. No.: 11/692,759

(22) Filed: Mar. 28, 2007

(51) Int. Cl.
*H05F 3/00* (2006.01)
*H05F 3/02* (2006.01)

(52) U.S. Cl. .............. 361/230; 361/231; 361/212; 324/72

(58) Field of Classification Search .............. 361/230, 361/231, 212; 324/72
See application file for complete search history.

(56) References Cited

U.S. PATENT DOCUMENTS

| | | | | |
|---|---|---|---|---|
| 3,898,547 A | * | 8/1975 | Poole | 320/109 |
| 4,459,597 A | * | 7/1984 | Blaese | 343/900 |
| 4,679,114 A | * | 7/1987 | Carpenter, Jr. | 361/117 |
| 5,694,286 A | * | 12/1997 | Fowler et al. | 361/220 |
| 6,980,410 B2 | * | 12/2005 | Kent | 361/118 |
| 6,982,680 B2 | * | 1/2006 | Janoschka et al. | 343/878 |

\* cited by examiner

*Primary Examiner*—Michael J Sherry
*Assistant Examiner*—Zeev Kitov
(74) *Attorney, Agent, or Firm*—Egbert Law Offices PLLC

(57) ABSTRACT

A lightning protection system having a sensor for detecting a polarity of atmospheric charges, a direct current power supply, a controller interactively connected to the power supply and to the sensor so as to select a polarity of the direct current in relation to polarity of atmospheric charges, a first lead connected to one location on the structure, and a second lead connected to another location on the structure such that direct current passes from the first lead to the second lead. The controller selects a polarity of the direct current that is opposite to the polarity of the atmospheric charges sensed by the sensor.

14 Claims, 3 Drawing Sheets

SYSTEM AND METHOD OF PROTECTING METALLIC STRUCTURES FROM LIGHTNING STRIKES

CROSS-REFERENCE TO RELATED U.S. APPLICATIONS

Not Applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to apparatus for protecting towers and other structures from lightning strikes. More particularly, the present invention relates to preventive devices for avoiding the damaging effects of lightning strikes.

2. Description of Related Art Including Information Disclosed Under 37 CFR 1.97 and 37 CFR 1.98

Lightning conceivably may have provided humankind with a first source of fire, but lightning has otherwise been a destructive force throughout human history. Strategies and apparatus for reducing the likelihood of damage by lightning are fairly old, including, for instance, lightning rods that have been use for approximately 200 years. While the use of such rods and other precautionary steps and safety devices reduce the damage and injury that would otherwise result from lightning today, it remains an enormously dangerous natural phenomenon that claims hundreds of lives worldwide every year and destroys a substantial amount of property. Somewhat paradoxically, advances in other areas of technology have increased, rather than diminished, the damage caused by lightning. This is because relatively low voltage and current levels can damage integrated circuits and other modern electronic components, with the result that many electronic devices are more susceptible to lightning damage today than ever before. Many devices to which microprocessor technology has been added are more susceptible to lightning damage as a result of such improvements. Additionally, lightning is capable of inducing substantial currents not only in electrical circuits directly struck by it but also in circuits located within the magnetic field induced by a nearby lightning strikes, giving each strike enormous destructive potential.

One of the most common areas of lightning strikes are large telecommunications and camera towers that extend upwardly from the earth. Typically, such towers include an electronic device at the top which serves to transmit or receive information. Since lightning will follow a path of least resistance on its way to the earth, the towers are very attractive to lightning.

Whenever lightning strikes a tower, an enormous amount of damage is created. Typically, the electronic device at the top of the tower is completely destroyed by the lightning. Furthermore, the structure of the tower and other associated electronics at the top of the tower can become damaged. Repair efforts on the tower are often time consuming and expensive. Typically, complete replacement of the electronic device at the top of the tower is required. As such, it is very important to develop a device which resists or prevents lightning strikes.

It is known that as a storm approaches, it will be highly charged with either positive or negative ions. In certain circumstances, the front side of a storm can be charged with positive ions and the back side of the storm can be charged with negative ions. As the storm would move through a particular region, the earth will be oppositely charged to that of the storm front. For example, if the storm is highly charged with positive ions, then the earth will be highly charged with negative ions. When metal structures are positioned on the earth (or in the water, as in the case of oil rigs) the strong charge of ions in the earth will flow through the metallic structure and upwardly above the earth. As such, a charged metal structure will present an attractive strike location for any lightning that may occur from the storm.

There exist devices known as differential field mills or field meters which can sense the polarity of an approaching storm and the intensity of such electrical field. Heretofore, these devices have not found use in preventing lightning strikes affecting metallic structures extending above the earth.

The present inventors were also the inventors of U.S. Pat. No. 5,694,286, issuing on Dec. 2, 1997. This patent was for a lightning protection device which relies on negative ion production at the top of the tower. The negative ion production device serves to produce solely negative ions around and over any electronic devices positioned on the towers. A special type of grounding rod, commonly known as an AUGER-ROD™, engages the earth so as to be conductively connected to the earth. An electrical line connects the grounding rod to the tower. A shield member is connected to the tower and extends over the electronic device on the tower. The negative ion production device is connected to the shield member so as to pass negative ions through the shield member. The negative ion production device can be one or more batteries that are connected together and have a negative terminal connected to the tower and a positive terminal connected to the electronic device.

Although, this device has been proven to be generally effective against the damaging effects of lightning strikes, it was found that a certain number of storms were negatively charged. Under such circumstances, the mere production of negative ions at the top of the tower would be attractive to the positive ions following the storm in the earth. Additionally, it was found that the use of batteries for the production of the negative ions was a less efficient approach than the use of a readily available alternating current power supply. It was further found that although the device was very effective at preventing lightning strikes to the electronic equipment located at the top of the tower, a large proportion of the tower would be available to a lightning strike below the upper portion of the tower. As such, a need developed so as to protect the entire tower from the possibility of the lightning strike, especially where the storm front was negatively charged.

It is an object of the present invention to provide a lightning protection device that effectively "masks" the metallic structure from lightning strikes.

It is another object of the present invention to provide a lightning protection system and method that serves to avoid damage caused by lightning strikes.

It is a further object of the present invention to provide a lightning protection system and method that is easy to use, easy to install and relatively inexpensive.

It is a further object of the present invention to provide a lightning protection system and method that can be retrofitted to existing towers and metallic structures.

It is a further object of the present invention to provide a lightning protection system and method which will be adjustable to the polarity of a storm or the magnitude of the storm.

These and other objects and advantages of the present invention will become apparent from a reading from the attached specification and appended claims.

BRIEF SUMMARY OF THE INVENTION

The present invention is a lightning protection system for metallic structures comprising a sensor means for detecting a polarity of atmospheric charges, a direct current power supply, a controller means interactively connected to the power supply and to the sensor means for selecting a polarity of the direct current power supply in relation to the polarity of atmospheric charges as sensed by the sensor means, a first lead extending from the controller means for passing the selected polarity of the direct current to a first location on the structure, and a second lead extending from the controller means for connecting to a second location on the structure such that the direct current of the selected polarity passes from the first lead through the structure to the second lead.

In an alternative embodiment of the present invention, the sensor means senses an intensity or magnitude of the atmospheric charges. The controller means adjusts the amperage of the direct current in relation to the intensity of the atmospheric charges.

In the present invention, the sensor means can either be a differential field mill or a field meter. In the present invention, the controller means selects a polarity of the direct current power supply that is opposite to the polarity of atmospheric charges as sensed by the sensor means.

The present invention obtains its direct current power supply from an AC power supply having a voltage and a rectifier means for converting the voltage of the AC power supply to a direct current of a desired voltage. A transformer is connected to the AC power supply for ramping down the voltage of the AC power supply. The rectifier is electrically connected to the transformer for converting the ramped down voltage from the AC power supply. In the preferred embodiment of the present invention, the voltage of the AC power supply is 240 volts AC. The transformer ramps the 240 volts AC to 48 volts AC. The rectifier converts the 48 volts AC to 48 volts DC.

The first lead is connected to a top of the structure. The second lead is connected to the bottom of the structure. As a result, the direct current will flow from the first lead at the top of the structure to the second lead at the bottom of the structure. A grounding means serves to connect the structure to ground. In the preferred embodiment of the present invention, the grounding means can comprise a central shaft having a plurality of spiral-shaped vanes positioned in spaced relationship along the central shaft and extending radially outwardly therefrom. An electrical line is connected to this central shaft and extends so as to be connected to the structure.

The present invention is also a method of protecting metallic structures from lightning strikes. This method includes the steps of: (1) sensing a polarity of atmospheric charges; and (2) applying a direct current of a polarity opposite to a sensed polarity to the structure. Additionally, a magnitude of the atmospheric charges is sensed such that the direct current is applied in an amperage in relation to the magnitude of the atmospheric charge.

DETAILED DESCRIPTION OF THE INVENTION

Figure 1:
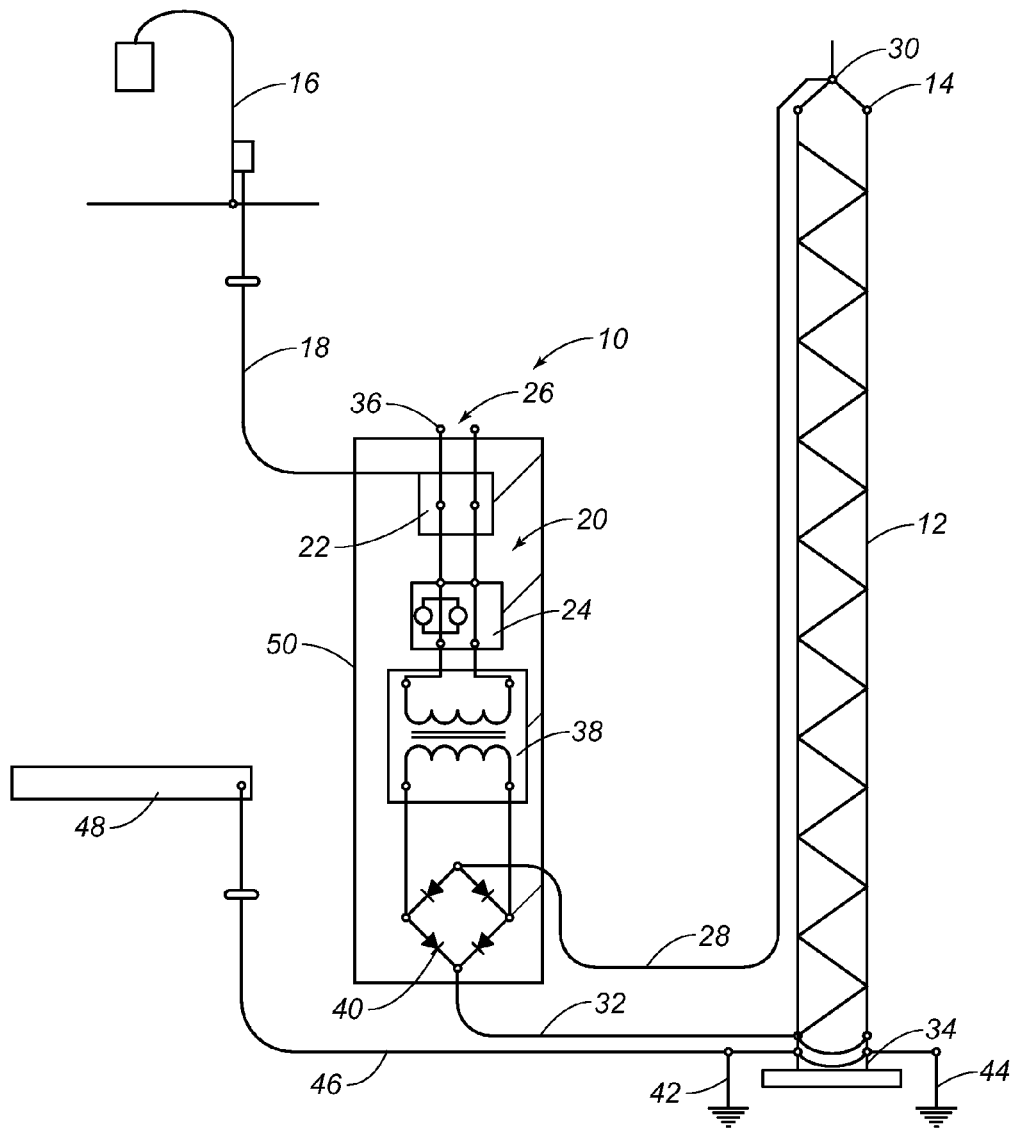
FIG. 1 is a diagrammatic illustration of the lightning protection system of the present invention.

Referring to FIG. 1, there is shown the lightning protection system 10 in accordance with the teachings of the present invention. The lightning protection system 10 is applied to tower 12 for the protection of electronic equipment that may exist at the top 14 of the tower 12. Within the concept to the present invention, the lightning protection system 10 can also be applied to various other metallic structures that extend upwardly from the earth, such as radio towers, communications towers, microwave antennas, cellular towers, radio antennas and television antennas. Additionally, the present invention can have particular application in association with offshore oil rigs and various other offshore devices, such as for communications system of large ships.

The system 10 of the present invention utilizes a sensor 16 that is electrically connected by line 18 to a controller system 20. The controller system 20 can include a profile controller 22 and a solid state controller 24. The controller system 20 is connected to a power supply 26. A first lead 28 is electrically interconnected to the controller system 20 and extends so as to be mounted at a first location 30 adjacent to the top of the metallic structure 12. A second lead 32 also is electrically interconnected to the controller system 20 and is connected adjacent to a bottom 34 of the metallic structure 12.

In the present invention, sensor 16 can be either a differential field mill or a field meter for measuring the polarity of atmospheric charges. Such differential field mills or field meters are known in the art. The differential field mill can be placed in proximity to the metallic structure 12 so as to effectively measure the atmospheric charge of an approaching storm. Most importantly, the differential field mill will sense the polarity of the atmospheric charges. The profile controller 22 will process this polarity so as to adjust the polarity of the direct current flowing to the metallic structure 12 through lead 28. Under other circumstances, the differential field mill 16 can sense the intensity of the atmospheric charges or the magnitude of the atmospheric charges. The solid state controller 24 can suitably increase the amperage from the power supply 26 in relation to the intensity or magnitude of the atmospheric charges.

It is important to note that experiments with present invention have indicated that it is important to apply a direct current to the metallic structure 12 so that the direct current will flow from the top 14 toward the bottom 34. The direct current that is applied to the metallic structure 12 should have a polarity which is opposite to the polarity of the atmospheric charges associated with an approaching storm. In normal circumstances, the earth will also have a polarity which is opposite of the polarity of the atmospheric charges of an approaching storm front. By applying the same polarity to the charges flowing through the metallic structure 12, the metallic structure 12 will be "invisible" to the earth, as far as the passing of charges is concerned. In other words, the metallic structure 12 will not be attractive to the flow of the highly charged ions flowing through the earth in correspondence with the storm. The highly charged ions in the earth will not flow up through the metallic structure 12 because of the "masking" effect created by the direct current flow through the metallic structure 12. As a result, the metallic structure 12 will be no more likely to be hit by the lightning strikes from a storm than would the surrounding earth.

The direct current power supply associated with the present invention has an AC power supply input 36. In particular, the AC power supply input 36 can be associated with a conventional electrical outlet that produces 240 volts of AC power. This power supply then passes to a transformer 38 for the purpose of ramping down the voltage from the power supply 36. In the preferred embodiment of the present invention, the transformer 38 will serve to ramp down the 240 volts AC to 48 volts AC. This ramped down voltage then passes to a rectifier 40 for the purpose of converting 48 volts AC to 48 volts DC. The direct current then passes along lead 28 to the top 14 of metallic structure 12. The direct current will then flow through the metallic structure 12 and pass outwardly along lead 32. To the extent of the metallic structure 12 supports any electronic equipment, the flow of direct current through the structure will be electrically isolated from any electronic equipment that may be mounted on the tower 12.

The metallic structure 12 is grounded to the earth through the use of grounding rods 42 and 44. Grounding rods 42 ad 44 are known as "AUGERRODS"™ and have a unique structure, as shown herein in FIG. 3. Additionally, the metallic structure 12 is also grounded through line 46 to the coax point of entry ground buss 48.

A suitable enclosure for housing 50 can enclose all of the components associated with the electronics of the system 10 of the present invention. As such, the enclosure will have a line 18 extending therefrom to the differential field mill 16, a power supply input 26 and leads 28 and 32 extending therefrom. The enclosure 50 can be positioned in proximity to the metallic structure 12.

Figure 2:
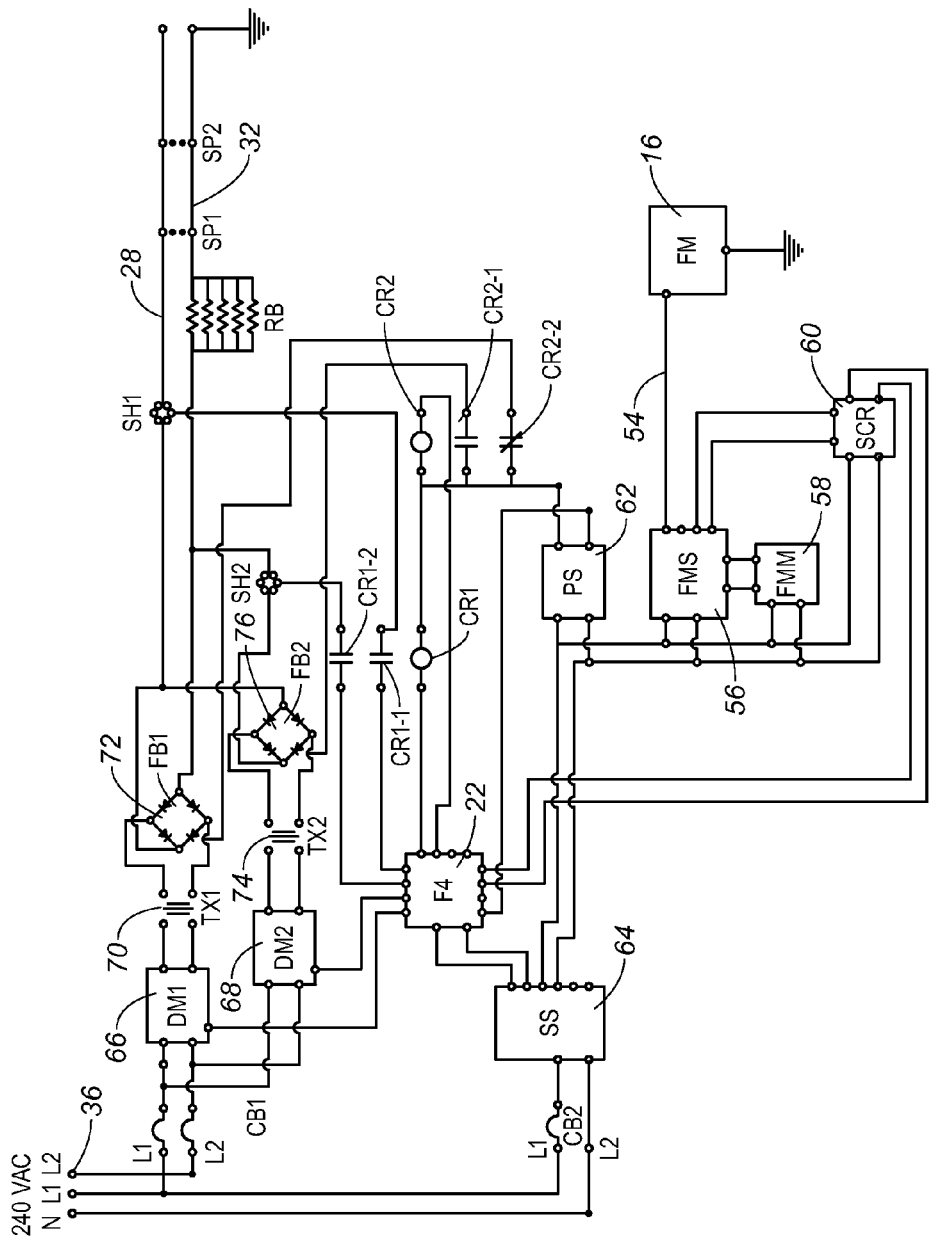
FIG. 2 is an electrical schematic representation of the lightning protection system of the present invention.

FIG. 2 is an electrical schematic showing the electronics associated with the system 10 of the present invention. Initially, it can be seen that the differential field mill 16 is electrically connected by line 54 to field mill supply 56. Field mill supply 56 is interactive with the field mill meter 58 and the signal conditioning relay 60. A power supply 62, such as a twelve volt battery, can provide power to the field mill 16.

A 240 volt AC power supply 36 provides power to the system across a surge suppressor 64. Profile controller 22 is connected to the field mill 16 so as to receive inputs from the field mill 16 and also to receive power from the 240 volt AC power supply 36. Profile controller 22 will process this information so as to deliver the power supply to either solid state controller 66 or solid state controller 68. For example, if the field mill 16 should detect strong positive charges in the approaching storm front, the solid state controller 66 can be activated while the solid state controller 68 remains inactive. On the other hand, if the storm is strongly negatively charged, then solid state controller 66 is deactivated and solid state controller 68 is activated. In the schematic of FIG. 2, the singular system form of the invention, shown in FIG. 1, is illustrated as a parallel circuitry form of the invention (having two solid state controllers, two transformers and two rectifiers) in FIG. 2.

In FIG. 2, transformer 70 and rectifier 72 function in the manner described hereinbefore for the purpose of sending a direct current charge along the lead 28 to the top of the structure 12 and along the lead 32 from the bottom of the structure. Solid state controller 68 passes the power supply along transformer 74 and rectifier 76 so as to be delivered to the leads 28 and 32 in the manner described hereinbefore.

Figure 3:
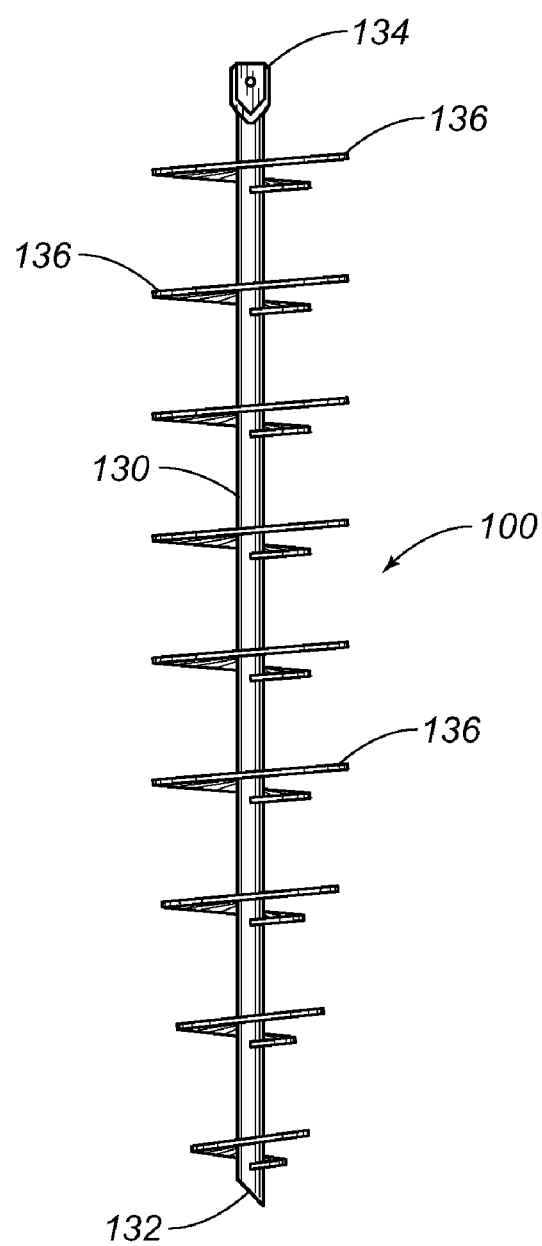
FIG. 3 is an isolated view showing one of the grounding rods as used in association with the present invention.

FIG. 3 illustrates, in detail, the auger 100 as used in association with the present invention. Auger 100 corresponds to grounding rods 42 and 44 of FIG. 1. It can be seen that the auger 100 has a central shaft 130 that extends from the pointed base 132 to the connection point 134. A plurality of spiral-shaped vanes 136 are positioned in spaced relationship longitudinally along the length of the shaft 130. Each of the spiral-shaped vanes 136 created the "digging" action of the auger 100. By rotating the auger 100, the vanes 136 will engage the earth so as to draw the auger 100 into the earth. The connection point 134 can be connected to a suitable rotational mechanism. After removal from the rotational mechanism, the connection point 134 can be used as a contact point for the electrical lines leading to the metallic structure 12. As can be seen, the great surface area along each of the vanes 136 and along the shaft 130 establishes strong electrical connections between the auger 100 and the earth. A carbon electrolyte can be placed over the surface of the auger 100 so as to further establish a strong electrical connection.

The microprocessor-based controllers associated with electric field mill of the present invention controls an isolated closed-loop DC charging system that provides a proportional charge to the tower of the voltage and polarity required for the intensity of the approaching storm. The charged tower then should repel the lightning streamer charge from the ground and prevent the charge from rising up the tower. This results in the tower not being a strike location.

The DC power for the tower protection is isolated from the primary AC source voltage. The maximum voltage generated by the power supply is only 48 volts of direct current. One leg of the power supply, when operational, is always bonded to the grounding system. As a result, there is virtually no shock hazard present to personnel. In addition, because the power supply's output is applied to the tower structure through an insulated 4/0 cable to an elevated ground plane electrode connected to the top of the tower structure and the tower base and the shelter/cabinet feed-through point is connected to the AUGERROD™ grounding system, there is no connection or hazard to communication system antennas, feed lines or tower mounted equipment.

The foregoing disclosure and description of the invention is illustrative and explanatory thereof. Various changes in the details of the illustrated construction or in the steps of the described method can be made within the scope of the appended claims without departing from the true spirit of the invention. The present invention should only be limited by the following claims and their legal equivalents.

I claim:

1. A lightning protection system for a metallic structure comprising:

a first sensor means for detecting a polarity of atmospheric charges;

a direct current power supply;

a controller means connected to said power supply and to said sensor means, said controller means for selecting a polarity of said direct current power supply in relation to polarity of atmospheric charges as sensed by said sensor means;

a first lead means extending from said controller means for passing the selected polarity of the direct current power supply to a first location on the structure; and a second lead means extending from said controller means for connecting to a second location on the structure such that the direct current of selected polarity passes from said first lead means to said second lead means, a second sensor means for sensing an intensity of the atmospheric charges, said controlling means for adjusting an amperage of said direct current power supply in relation to the intensity of said atmospheric charges.

2. The system of claim 1, said sensor means being a differential field mill or a field meter.

3. The system of claim 1, said controller means for selecting the polarity of said direct current power supply that is opposite to the polarity of atmospheric charges sensed by said sensor means.

4. The system of claim 1, said direct current power supply comprising:
   an AC power supply having a voltage; and
   a rectifier means for converting the voltage of said AC power supply to a direct current having a voltage.

5. The system of claim 4, further comprising:
   a transformer means connected to said AC power supply for ramping down said voltage of said AC power supply, said rectifier means electrically connected to said transformer means for converting the ramped down voltage from said AC power supply to said direct current.

6. The system of claim 5, said voltage of said AC power supply being 240 volts AC, said transformer means for ramping down the 240 volts AC to 48 volts AC, said rectifier means for converting the 48 volts AC to 48 volts DC.

7. The system of claim 1, said first lead means for connecting to a top of the structure, said second lead means for connecting to a bottom of the structure.

8. The system of claim 1, further comprising:
   a grounding means for connecting the structure to ground.

9. The system of claim 8, said grounding means comprising:
   a central shaft;
   a plurality of vanes positioned in spaced relationship along said central shaft so as to extend radially outwardly therefrom; and
   an electrical line connected to said central shaft and extending so as to be connected to the structure.

10. A lightning protection system comprising:
    a metallic structure extending upwardly from the earth;
    a first sensor means for detecting a polarity of atmospheric charges;
    a direct current power supply;
    a controller means connected to said power supply and to said sensor means, said controller means for selecting a polarity of said direct current power supply in relation to the polarity of atmospheric charges as sensed by said sensor means;
    a first lead electrically connected to said controller means and connected to a first location on said metallic structure; and
    a second lead electrically connected to said controller means and connected to a second location on said metallic structure such that the direct current of selected polarity passes from said first lead to said second lead, a second sensor means for sensing an intensity of said atmospheric charges, said controller means for adjusting an amperage of said direct current power supply in relation to the intensity of said atmospheric charges.

11. The system of claim 10, said first location being a top of said metallic structure, said second location being a bottom of said metallic structure.

12. The system of claim 10, said direct current power supply comprising:
    an AC power supply having a voltage;
    a rectifier means for converting the voltage of said AC power supply to a direct current having a voltage; and
    a transformer means connected to said AC power supply for ramping down said voltage of said AC power supply, said rectifier means electrically connected to said transformer means for converting the ramped down voltage from said AC power supply.

13. The system of claim 10, further comprising:
    a grounding means for connecting the said metallic structure to ground.

14. The system of claim 10, said metallic structure being a tower having electronic equipment thereon, the direct current passing from said first lead to said second lead being electrically isolated from said electronic equipment.

* * * * *